(12) United States Patent
Byrne et al.

(10) Patent No.: US 6,587,740 B2
(45) Date of Patent: Jul. 1, 2003

(54) SYSTEM, METHOD AND COMPUTER PROGRAM PRODUCT FOR DETERMINING AN ANGLER RATING

(75) Inventors: John Byrne, Rock Hill, SC (US); Steve Malvestuto, Eastpoint, FL (US); Peter Smith, Chapel Hill, NC (US); Dave Stribling, Rock Hill, SC (US)

(73) Assignee: AnglersChannel.com, LLC, Rock Hill, SC (US)

( * ) Notice: Subject to any disclaimer, the term of this patent is extended or adjusted under 35 U.S.C. 154(b) by 101 days.

(21) Appl. No.: 09/974,235

(22) Filed: Oct. 10, 2001

(65) Prior Publication Data

US 2003/0100966 A1 May 29, 2003

(51) Int. Cl.[7] .................. G06F 155/00; G08B 1/08
(52) U.S. Cl. .................. 700/91; 340/539; 43/4.5
(58) Field of Search ............... 700/91, 92, 93; 340/539, 323 R; 43/4, 4.5

(56) References Cited

U.S. PATENT DOCUMENTS

| | | | | | |
|---|---|---|---|---|---|
| 4,578,889 A | * | 4/1986 | Hill | ............................ | 43/4.5 |
| 6,222,449 B1 | * | 4/2001 | Twining | ..................... | 340/539 |
| 6,459,372 B1 | * | 10/2002 | Branham et al. | ........... | 340/539 |
| 2002/0099457 A1 | * | 7/2002 | Fredlund et al. | .............. | 700/91 |
| 2003/0056419 | * | 3/2003 | Squires et al. | ................ | 43/4.5 |

* cited by examiner

Primary Examiner—Michael O'Neill
(74) Attorney, Agent, or Firm—Alston & Bird LLP

(57) ABSTRACT

A system for determining at least one angler rating for at least one angler comprises a processing element, at least one electronic database and an output element. The processing element can receive fishing information, where the fishing information is associated with at least one lake. Based on at least a portion of the fishing information, the processing element is capable of determining the at least one angler rating. The electronic databases are responsive to the processing element for storing the electronic fishing information based upon the fishing information received by the processing element. The electronic databases are further capable of storing the angler ratings. The output element is responsive to the processing element for outputting the angler ratings.

50 Claims, 6 Drawing Sheets

| | 20 |
|---|---|

Welcome to the Journal Entry — 22

| Trip Name: | | If this was a club event, select the appropriate club. |
|---|---|---|
| Date: | mm/dd/yyyy | |
| Trip Time: | 12:00 PM to 12:00 PM | |
| State: | North Carolina | Was this a non-club tournament or ○ Yes ● No event? — 36 |
| Lake: | Lake Norman | |
| Target Species: | ----------------- | Tournament Name: |

26

Trip Activity — 32

Strikes: 5    Hook-ups: 4    Catches: 4    Releases: 2

24 — [update catch information]   [cancel trip]   38   Printable Journal

Catch Information

| | catch #1 | catch #2 | catch #3 |
|---|---|---|---|
| Catch Time | 12:00 PM | 12:00 PM | 12:00 PM |
| Fish Species | | | |
| Bait Used | | | |
| Technique | | | |
| Cover | | | |
| Location Type | | | |
| Lake Section | unknown | unknown | unknown |
| Water Clarity | | | |
| Depth | 0 ft. | 0 ft. | 0 ft. |
| Length | 0.00 in. | 0.00 in. | 0.00 in. |
| Weight | 0 lbs. 0.00 oz. | 0 lbs. 0.00 oz. | 0 lbs. 0.00 oz. |

| | catch #4 |
|---|---|
| Catch Time | 12:00 PM |
| Fish Species | |
| Bait Used | |
| Technique | |
| Cover | |
| Location Type | |
| Lake Section | unknown |
| Water Clarity | |
| Depth | 0 ft. |
| Length | 0.00 in. |
| Weight | 0 lbs. 0.00 oz. |

38

Notes

FIG. 2A

SYSTEM, METHOD AND COMPUTER PROGRAM PRODUCT FOR DETERMINING AN ANGLER RATING

FIELD OF THE INVENTION

The present invention relates to systems and methods of providing electronic fishing information and, more particularly, to systems and methods of providing an angler rating for at least one angler.

BACKGROUND OF THE INVENTION

According to many reports today, more people participate in recreational fishing in the United States than in golf and tennis combined. And even the best anglers often have difficulty finding and catching the fish they are pursuing. In an attempt to improve their knowledge of where fish might be, and to generally increase the quality and success of their fishing experience, more and more anglers are using state-of-the-art technology, such as global positioning satellites and sonar technology, to help them map out and view the contents of the waters they are fishing. In addition, feeding habits and seasonal movement patterns are being studied to better understand the fish and their habits.

To determine where fish will be and the likelihood of a fish striking at any given time, a multitude of variables must be analyzed. Among these variables, anglers must consider location, weather conditions, water temperature, time of year, techniques and equipment used. Because of the complexity of the interactions of the variables, however, considering the multitude of variables is generally far too complex for the human brain to accurately process and understand. In this regard, anglers could spend a lifetime in their local waters alone trying to determine how the interactions between these variables impact their ability to predict the best methods and timing for catching fish.

To assist anglers in analyzing many of the variables, anglers have long kept fishing journals that include the variables for each fishing trip the angler took. While these fishing journals assisted the angler somewhat in increasing the angler's chance of success, journals kept by individual anglers are inherently limiting in that such journals only contain entries for each angler. In this regard, anglers often have very limited information as to variations of the variables sufficient enough to formulate an adequate determination of the likelihood of a fish striking at any given time. In addition, as weather is a variable that tends to affect the habits of fish, adequately documenting a fishing trip in a journal requires anglers to document the weather during each fishing trip or while catching each fish. But due to the faulty memories of many anglers and inconsistencies in documenting weather, adequate documentation of weather is often difficult to keep. Therefore, it would be desirable to develop a system that integrates the journals of a plurality of anglers and provides a uniform method by which weather during a fishing trip can be determined and documented.

In addition to fishing for recreation, many anglers enhance their fishing experience by fishing for sport by comparing their fishing experience and ability against other anglers, such as by participating in competitions such as fishing tournaments where the anglers compete against one another. This comparison is often adequate to allow anglers of similar experience and ability to compete against one another. But due to the complexity of the variables used to increase the likelihood of catching fish, experienced anglers are often at an unfair advantage with respect to less experienced anglers. Thus, it would be desirable to further develop an angler rating to handicap more experienced anglers and even the field of competition among various anglers.

SUMMARY OF THE INVENTION

In light of the foregoing background, the present invention provides systems, methods and computer program products for determining at least one angler rating for at least one angler. The systems, methods and computer program products of the present invention enhance the fishing experience of anglers by providing a method by which anglers can compare themselves to their peers with a more even comparison that accounts for their relative fishing experience and ability. In this regard, the angler ratings serve to handicap more experienced anglers and even the field of competition among various anglers when drawing comparisons among the anglers.

According to one embodiment, a system for determining at least one angler rating for at least one angler includes a processing element and an output element. The processing element is capable of receiving fishing information, where the fishing information is associated with at least one lake. And based on at least a portion of the fishing information, the processing element can determine the angler ratings for the anglers. In another embodiment, the system further includes at least one electronic database, which is responsive to the processing element. And in a further embodiment, the electronic databases communicate with the processing element across a wide area network (WAN), such as the Internet. The electronic databases can store the electronic fishing information based upon the fishing information received by the processing element. Also, the electronic databases are capable of storing the angler ratings. The output element, which is also responsive to the processing element, is capable of outputting the angler ratings, such as a graphical user interface displaying the angler ratings.

In operation, the angler ratings are formed by first providing the fishing information. Next, angler ratings are determined and then output, such as by the output element. In a further embodiment, the angler ratings are determined by first determining at least one trip point value for at least one fishing trip. Then, at least one score is calculated based upon the trip point values determined and at least one standard value for at least one lake associated with the at least one fishing trip on at least one lake, such as by subtracting the standard value for a respective lake from the trip point value for a fishing trip at the respective lake. In one embodiment, the trip point values are determined such that each trip point value is bounded by an upper limit and a lower limit. In another embodiment, the standard values are established before calculating the scores, such as by setting the at least one standard value equal to a predetermined percentile of a distribution of a plurality of trip point values for the respective lakes. Next, the angler ratings are determined based upon the at least one score and a number of fishing trips.

In a further embodiment, the trip point values are determined by calculating at least one fish size index for at least one fish based upon a weight and a length point value for the at least one fish, such as by multiplying the weight by a length point value. In this regard, the length point value is based upon at least one length of the fish and a world record length of at least one species of the fish. Then, the at least one quality per length class is determined based upon the fish size indexes and a number of the fish in a given length class, such as by multiplying a number of the fish in a given length class by the fish size indexes.

After the quality per length classes are determined, at least one quality per target species is computed based upon the at least one quality per length class and a number of length classes of fish targeted. When a group of species are targeted, the computing is further based upon a number of fish of a species targeted in the group. For example, the quality per target species can be computed by aggregating each quality per length class over a number of length classes of fish targeted and, when a group of species are targeted, by further aggregating the aggregate quality per length classes over a number of species targeted in the group. In a further embodiment, quality per target species are computed for each fish harvested and each fish released for each fishing trip.

Once the quality per target species are calculated, trip point values are determined based upon the at least one quality per target species and a trip length. For example, the trip point values can be determined by taking the square root of the sum of the quality per target species for the fish harvested and the fish released divided by the trip length. In another embodiment, the trip point values are determined based upon at least one predetermined weighting of the at least one quality per target species fish released, such as a sport fish predetermined weighting and a food fish predetermined weighting.

The systems, methods and computer program products of the present invention enhance the fishing experience of anglers by forming angler ratings. The angler ratings, in turn, handicap more experienced anglers and even the field of competition among various anglers when drawing comparisons among the anglers.

BRIEF DESCRIPTION OF THE DRAWINGS

Figure 1:
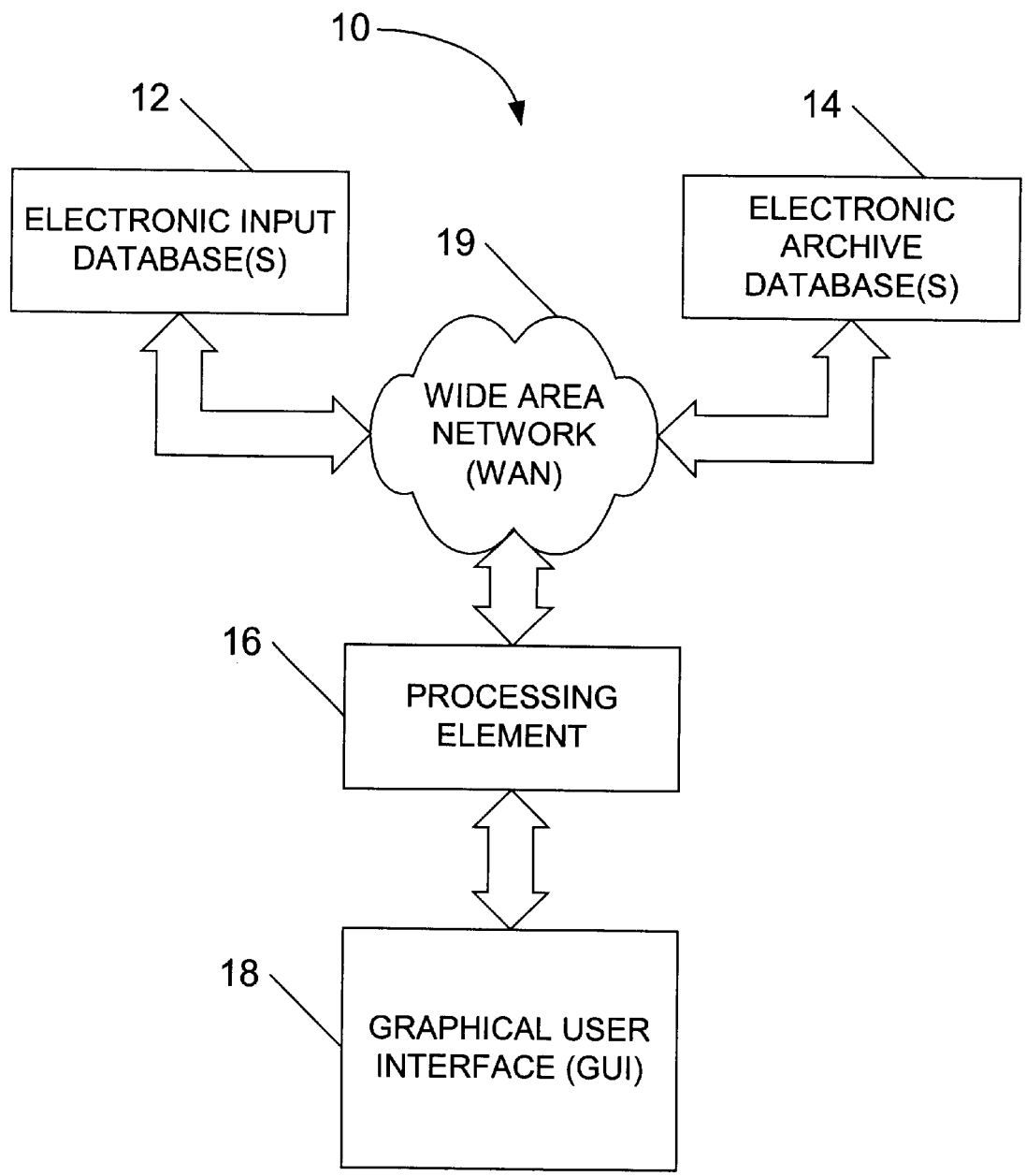
Figure 2B:
Figure 3:
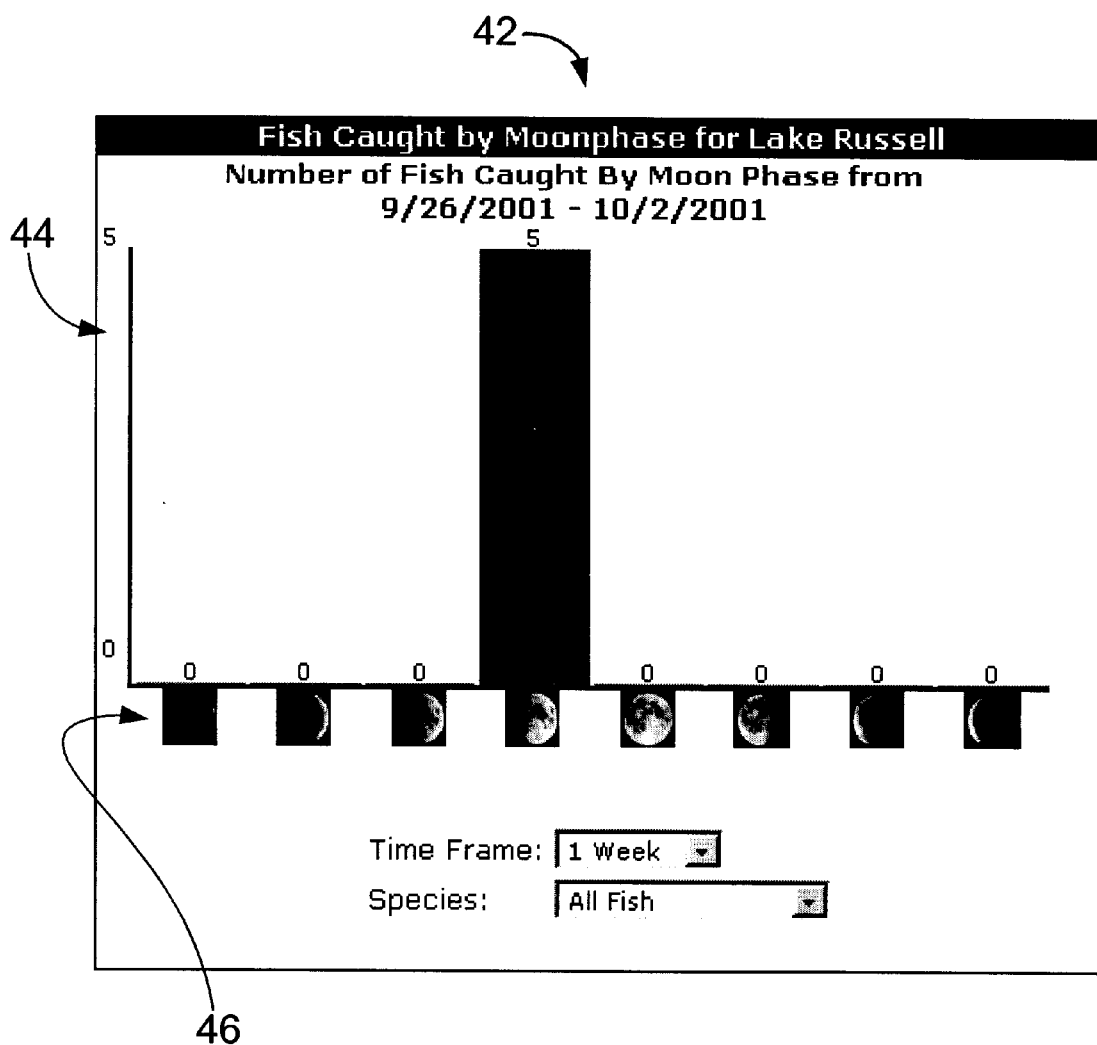
Figure 4:
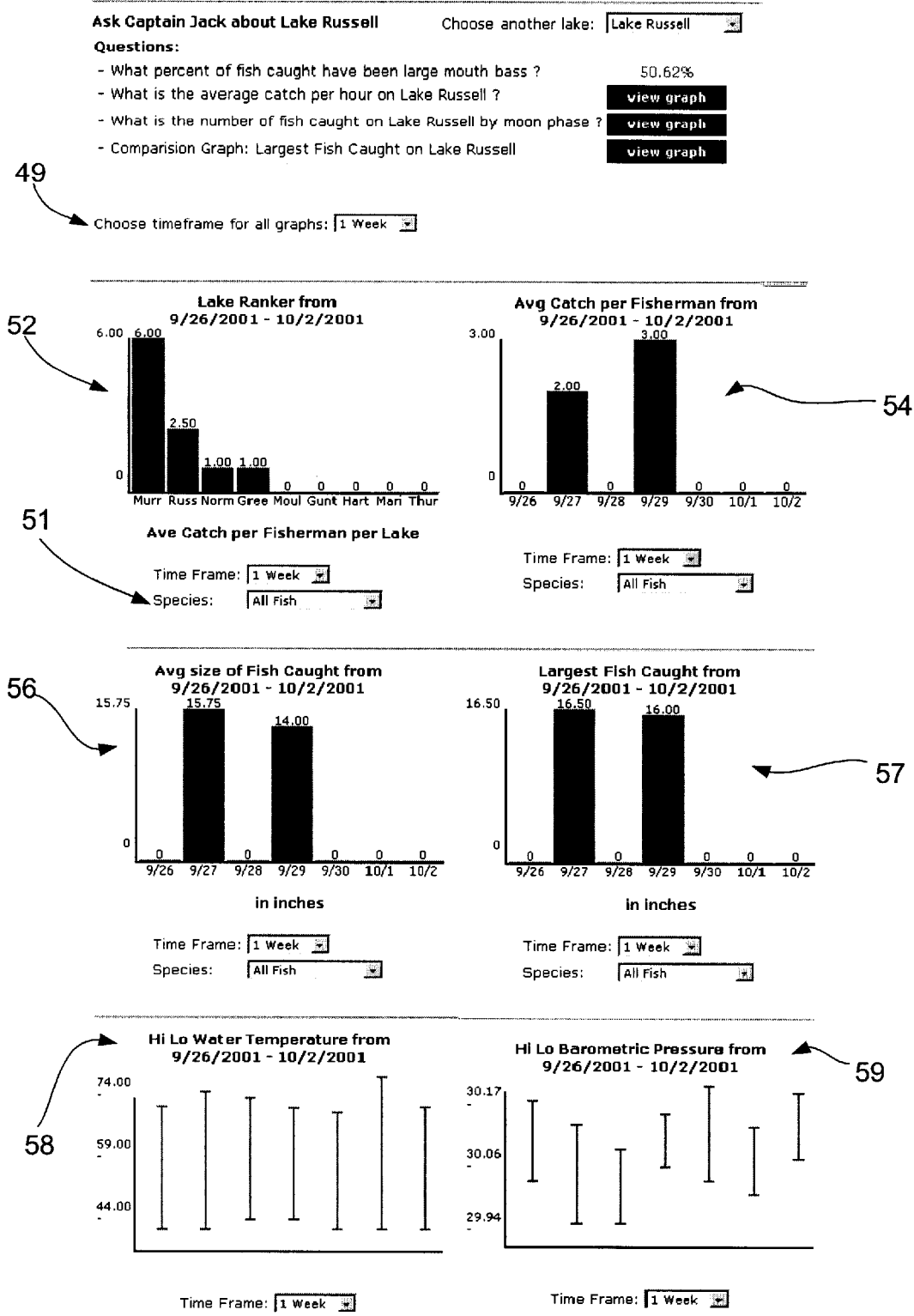
Figure 5:
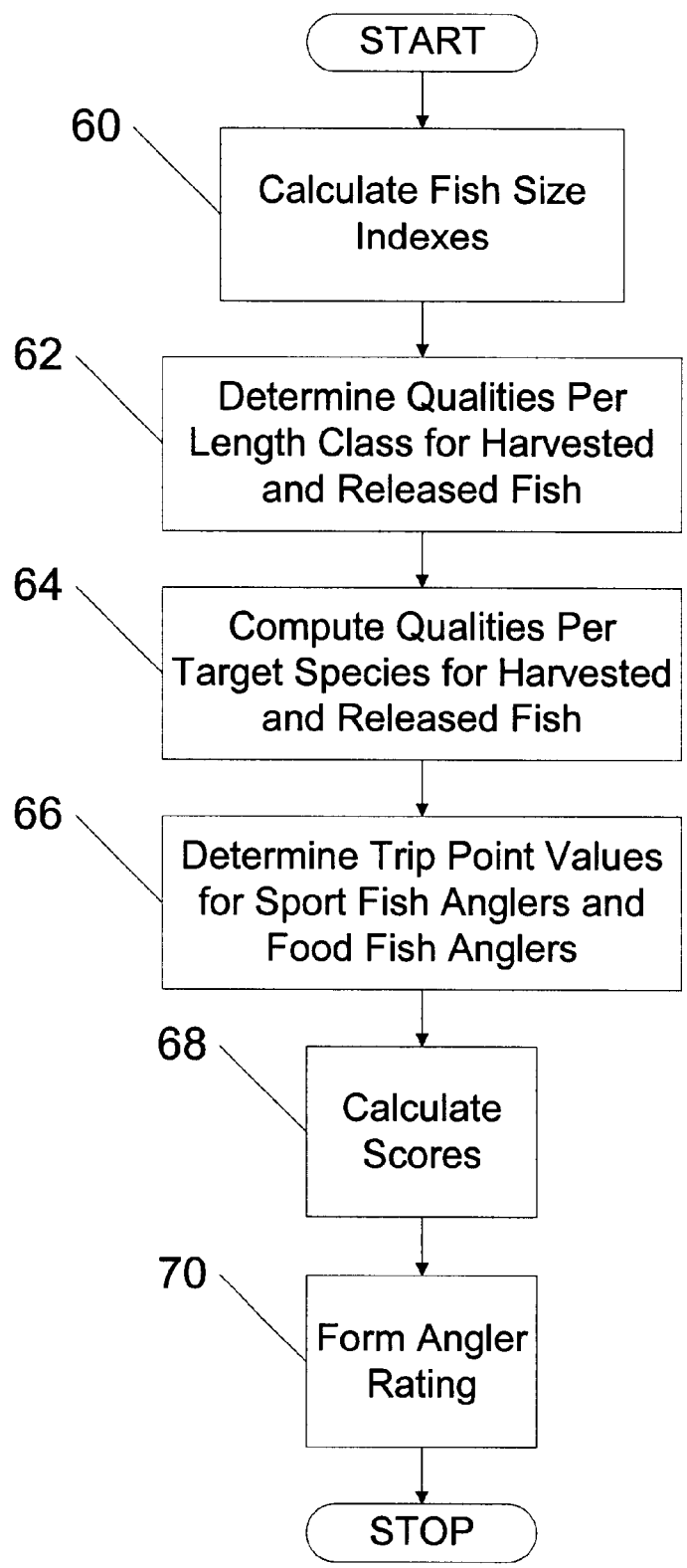

Having thus described the invention in general terms, reference will now be made to the accompanying drawings, which are not necessarily drawn to scale, and wherein:

FIG. 1 is a block diagram of a system for determining at least one angler rating for at least one angler, according to one embodiment of the present invention;

FIGS. 2A and 2B are schematic illustrative displays of a journal entry display of the graphical user interface of one embodiment of the present invention;

FIG. 3 is a schematic illustrative display of dynamic electronic information displayed by the graphical user interface of one embodiment of the present invention;

FIG. 4 is another schematic illustrative display of dynamic electronic information displayed by the graphical user interface of one embodiment of the present invention; and FIG. 5 is a flow chart illustrating various steps of a method of determining at least one angler rating for at least one angler according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a system 10 for providing fishing information for a plurality of anglers includes at least one electronic database 12, at least one electronic weather database 14, a processing element 16 and an output element, such as a graphical user interface (GUI) 18. The processing element is capable of receiving fishing information. The processing element can comprise any of a number of different devices, such as a personal computer or other high level processor. The electronic databases are capable of storing the fishing information. The electronic databases and the electronic weather databases, which is capable of storing electronic weather information, can comprise any of a number of known electronic databases. And whereas the electronic databases and electronic weather databases are illustrated and described as separate elements, it should be understood that the same electronic database can perform the functions of both the electronic databases and electronic weather databases without departing from the spirit and scope of the present invention. To communicate, the processing element and the electronic databases are in electrical communication. In this regard, the processing element and electronic databases can communicate in a number of different manners but, in a preferred embodiment, communicate via a wide area network (WAN) 19, such as the Internet. As a result, in one typical configuration, the processing element and GUI reside at a location proximate an angler who inputs fishing information into the processing element. The processing element, in turn, can store the fishing information in the electronic databases, which can be connected to a central server and located remote from the processing element.

The fishing information received by the processing element 16 can originate from any of a number of different sources and can include any of a number of different pieces of information. The fishing information can originate from historical records, such as those stored by states. Additionally, or alternatively, the fishing information can originate from anglers who typically gather the fishing information during fishing trips. In this regard, since anglers preferably continue to take fishing trips and continue to gather fishing information, the contents of the electronic databases are constantly changing and being updated. As a result, in a preferred embodiment the fishing information is based on at least one fishing trip to at least one lake. For example, the fishing information for each trip can include trip information, as well as trip activity and catch information for each fish caught during the trip. The trip information can include information such as trip name, trip date, trip time, state trip taken to, lake fished, whether the trip was sponsored by a fishing club and the sponsoring club, whether the trip was a tournament, the number of fish strikes, the number of fish hook-ups and the number of fish caught (i.e., catches). The trip activity information can include information such as the number of fish strikes, fish hook-ups, fish caught and fish released. And the catch information can include information such as estimated catch time, fish species, bait and technique used to catch the fish, whether cover existed over the water at the catch location, location type of the body of water fished, lake section, water clarity, depth of the water of the fish when caught (i.e., catch depth), and length and weight of the fish caught.

In addition to receiving the fishing information, the processing element 16 can determine the weather during each catch based upon the estimated catch time and location of lake fished. In this regard, the processing element can determine weather information such as temperature, wind speed, dew point, humidity, heat index, wind chill, barometer reading, sunrise and sunset times, and moon phase. Additionally, the processing element can determine marine weather for different bodies of water, including information such as water temperature, water level and visibility. The processing element can store the weather data along with the electronic fishing information in the electronic databases.

The processing element can determine the weather utilizing any of a number of known systems, such as any of a number of known weather data systems. In one advantageous embodiment, the processing element determines the weather by communicating with an electronic weather database, which preferably stores the weather according to location and time. For example, one electronic weather database can include information from a weather service, such as Data Transmission Network, which provides the weather at fifteen minute intervals.

The GUI 18, which can comprise any of a number of known devices, is responsive to the processing element 16 for displaying the electronic fishing information. In this regard, reference is now made to FIGS. 2A and 2B, which illustrates one exemplar fishing information input display, or journal entry display 20, from the GUI. Because, as stated before, since anglers preferably continue to take fishing trips and continue to gather fishing information, an angler would typically input fishing information into the processing element based upon the fishing information input display after one or more fishing trips. As shown, the journal entry display includes various fields for receiving the fishing information related to a selected fishing trip. The fields can additionally be broken into sections by information type, including trip information 22, catch information 24 (including trip activity 26). Average weather and water information can additionally be displayed in a weather information section 28 and a water information section (not shown), respectively, based upon the date of the fishing trip. The average weather and water information can be determined by the processing element in any one of a number of manners, such as those outlined above. The average weather and water information can be displayed at any time after receiving a date associated with the fishing information, such as by updating the journal entry display, as shown in FIG. 2B. As the fishing information can be broken down into sections, each section can be displayed individually, or in groups, or altogether, as shown. The fishing information can be received and displayed in any of a number of manners, including via a text field 32, a drop-down menu 34 and a button select 36.

As shown, the various fields within the catch information section 24 consist of catch groups 38, with each catch group including fields for receiving information regarding each fish caught during the given fishing trip. As apparent, the number of catch groups necessary for a given fishing trip will vary depending upon the number of fish caught during a given fishing trip. Therefore, the number of catch groups displayed by the GUI 18 preferably varies in response to the number of fish caught during the respective fishing trip. In this regard, the trip activity section includes a catches field 38, which can be used to receive the number of fish caught during the fishing trip and thereafter determine the number of catch groups displayed in the catch information section.

As previously stated, in addition to receiving the fishing information the processing element 16 can determine the weather during each catch based upon the estimated catch time and location of lake fished. In this regard, the journal entry display 20 displayed by the GUI 18 can include a weather element 40, as shown in FIG. 2B. The weather element can comprise any of a number of different elements but, in the preferred embodiment, comprises a pointer such as a hypertext link (e.g., "catch weather"). Once an angler selects the weather element, the processing element 16 determines the weather along the lines described above. The GUI can then display the weather such as in the weather information section 28 of the fishing information input display or in a separate display (not shown). In an alternative embodiment, once the angler has input the date of the fishing trip and after the angler has input the time for each catch of the fishing trip, the processing element can automatically determine the weather and, thereafter, the GUI can display the weather for each respective catch, such as by updating the journal entry display with the weather information.

After the processing element 16 has received all of the fishing information, the processing element can save the fishing information into the electronic databases 12. Thereafter, the processing element can display the fishing information in any of a number of different manners, including displaying the fishing information by a selected lake, which could include fishing information for all anglers who previously input fishing information associated with the respective lake. Also, the fishing information can be displayed by a selected angler and a selected fishing trip, in a manner similar to the journal entry display 20. Additionally, based at least partially upon the fishing information, the processing element can determine and generate dynamic electronic information for display by the GUI 18 to improve anglers' future fishing experiences, including dynamic electronic information such as predictions, graphical summaries of anglers' fishing experiences by a selected lake, and an angler rating. As such, in a typical application, the angler would display the fishing information and/or the dynamic electronic information prior to taking a future fishing trip to thereby plan the optimum conditions upon which to take the fishing trip.

The processing element 16 can determine predictions for a number of different aspects of fishing, including such things as the probably of success, and the best methods, timing, equipment and location for catching fish. In this regard, the processing element will preferably utilize neural network technology along with at least a portion of the fishing information stored by the electronic database. As known to those skilled in the art, neural network technology is technology modeled upon the human brain's interconnected system of neurons. Based upon this premise, the neural network technology allows processing element can imitate the brain's ability to sort out patterns and learn from trial and error, discerning and extracting the relationships that underlie the fishing information. The network learns when the previously received fishing information (with known results) is presented to processing element. Factors associated with the known results are then adjusted to bring the final predictive output closer to the known result.

In addition to determining predictions, the processing element 16 can generate dynamic electronic information consisting of summaries of fishing experiences of at least one angler, preferably a plurality of anglers, based upon a selected lake and a defined period of time, which are then displayable by the GUI 18. Also, the dynamic electronic information can further be based upon a selected fish species, in addition to the selected lake and defined period of time. The dynamic electronic information can include any of a number of different graphical summaries for the selected lake in the defined time period, such as number of fish caught, average catch per angler, average size of the fish caught, the largest fish caught, the high and low water temperatures, and the high and low barometric pressure readings. Also, the dynamic electronic information can include summaries for a selected lake such as, the average catch per hour, the average precipitation, and the chances of catching a particular species of fish in a future time period (such as by utilizing the neural network technology).

Referring now to FIGS. 3 and 4, the GUI 18 can display the dynamic electronic information in any one of a number of different manners. For example, as shown in FIG. 3, the display can consist of a bar graph 42 of the number of fish caught in the last predetermined time period (e.g., week) by moon phase, with the number of fish caught represented by the bars extending along the vertical axis 44, and the moon phase represented along the horizontal axis at 46 the point of origin of the bars. As shown, for example, five fish were caught during the defined week at the selected lake during one moon phase, with no other fish caught during the week.

Additionally, or alternatively, the GUI can display a number of different summaries for a given lake, as shown in FIG. 4. For example, the GUI can display various graphs for the selected lake with a defined time period selected from a time select element 49, such as by a drop-down menu associated with the graphs. Also, the GUI can display the summaries further based upon a fish species, by selecting a fish species from a species select element (not shown). Additionally, or alternatively, a plurality of defined time periods can be selected by a plurality of drop-down menus, with each time period associated with a respective graph. Similarly, the a plurality of fish species can be selected from a plurality of species select elements 51, such as a plurality of drop-down menus. As shown, for example, the GUI can display summaries by displaying graphs for a selected lake over a defined period of time, including the average catch per fisherman (i.e., angler) per lake 52, the average catch per fisherman 54, the average size of fish caught 56, and the largest fish caught 57, the high-low water temperature 58 and the high-low barometric pressure 59. The GUI can further display summaries by displaying graphs for dynamic electronic information such as average catch per hour, number of fish caught per moon phase (as described above), and comparison of largest fish caught on the selected lake during all time periods to the largest fish caught by a selected angler. Based on this information, anglers are provided with the information necessary to formulate an adequate determination of the likelihood of a fish striking at any given time. Thus, anglers can fish more wisely and statistically should have a better chance of catching fish.

According to another advantageous embodiment, the processing element 16 is capable of determining an angler rating for each of a plurality of anglers for display by the GUI 18. The angler rating is based at least upon the fishing electronic information stored in the electronic databases 12. According to one embodiment, after fishing information associated with at least one fishing trip has been received by or provided to the processing element, the processing element determines each angler rating by initially determining a trip point value for a fishing trip of the respective angler at a specific lake. A score is then calculated based upon the trip point value and a standard value for the specific lake. Finally, the angler rating is formed based upon the at least one score and a number of fishing trips.

Referring now to FIG. 5, determining the trip point value (i.e., Catch Points) is based on recording, and then mathematically relating, several catch characteristics of the fish caught during a fishing trip. Preferably, the catch characteristics are relevant only for species that anglers are targeting.

In this regard, anglers may be targeting individual species (e.g., largemouth bass) or a group of related species (e.g., catfish). Catch characteristics used to determine the Catch Points, CP, generally consist of the number, length and weight of (a) target fish harvested and (b) target fish released. For purposes of illustration throughout, consider an angler targeting largemouth bass who caught four largemouth bass and released two of the fish, as shown in Table1.

TABLE 1

| Category | Length (in) | Weight (lbs.) |
| --- | --- | --- |
| Harvest | 15 | 2.5 |
| Harvest | 16 | 3.0 |
| Release | 12 | 0.9 |
| Release | 14 | 1.8 |

For the target fish harvested and target fish released, a size index, SI, is calculated for each fish harvested and each fish released, respectively. (Block 60). The SI can be calculated in any of a number of manners but, in a preferred embodiment, is calculated by multiplying the weight of the fish by a length point value, as shown by the following equation (1):

$$SI = W \times LPV \tag{1}$$

where, W is the weight, in pounds, of a fish of a given length, and LPV is the length point value of the fish. The LPV can be derived in any one of a number of different manners but, in a preferred embodiment, is derived from the world record length for that species, as described in Weithman & Anderson, *A Method of Evaluating Fishing Quality*, FISHERIES 6–10 (1978), the contents of which is hereby incorporated by reference in its entirety. As described in Weithman & Anderson, the LPV is derived for a given fish by comparing its actual length to the world record length for that species. Length Point Values vary from 1.00 for fish less than 10% of the world record length to 3.00 for fish greater than 90% of the world record length. Given a world record length large mouth bass twenty-eight inches long, for the example fishing trip of the aforementioned angler, the SI and LPV values of the fish caught are summarized in Table 2.

TABLE 2

| Category | Length (in) | Weight (lbs.) | LPV | SI |
| --- | --- | --- | --- | --- |
| Harvest | 15 | 2.5 | 2.43 | 6.08 |
| Harvest | 16 | 3.0 | 2.62 | 7.86 |
| Release | 12 | 0.9 | 1.38 | 1.24 |
| Release | 14 | 1.8 | 2.00 | 3.60 |

Once the size index has been calculated, the processing element 16 determines at least one quality per length class. (Block 62). According to one advantageous embodiment, each quality per length class is determined by multiplying a number of fish in a given length class by the fish size index of the fish in the length class. In this embodiment, a length class is defined as a series of lengths separated over a constant interval, with other weighted fish rounded to the nearest length in the series. In one advantageous embodiment, the length classes can be defined as a series of lengths separated by one inch, with intermediate length fish rounded to the nearest inch. Thus, for example, fish having a length between 4.5 and 5.0 inches would reside in the 5.0 inch length class, and fish having a length between 4.0 and 4.49 inches would reside in the 4.0 inch length class.

Utilizing the number of fish in each length class, the quality per length class can be determined according to the following equation (2):

$$Q_L = N \times SI \quad (2).$$

where $Q_L$ is the quality per length class, and N is the number of fish in a given length class. The fish can be recorded in any one of a number of manners, including by grouping the fish into a plurality of length classes or by recording each fish in a unique length class. As is apparent, if fish are recorded on an individual basis into a unique length class, then N will equal one. Recording each fish in a unique length class, for the example fishing trip given above, the harvest quality per length class ($HQ_L$) and release quality per length class ($RQ_L$) can be summarized in Table 3.

TABLE 3

| Category | Length (in) | Weight (lbs.) | LPV | SI | $HQ_L$ | $RQ_L$ |
|---|---|---|---|---|---|---|
| Harvest | 15 | 2.5 | 2.43 | 6.08 | 6.08 | — |
| Harvest | 16 | 3.0 | 2.62 | 7.86 | 7.86 | — |
| Release | 12 | 0.9 | 1.38 | 1.24 | — | 1.24 |
| Release | 14 | 1.8 | 2.00 | 3.60 | — | 3.60 |

Once the quality per length classes have been determined, the processing element 16 computes a quality per target species for the number of length classes represented by summing the quality per length classes across the number of length class lengths within the species of target fish. (Block 64). In this regard, the quality per target species can be computed according to the following equation (3):

$$Q_S = \sum_c Q_L \quad (3)$$

where $Q_S$ is the quality per target species, and c is the number of length classes represented. That is, the quality per target species can be calculated by aggregating the quality per length classes $Q_L$ across c lengths within the species. If the angler is targeting a group of related species, however, the quality per target species can be calculated by further aggregating the aggregate of the quality per length classes across the number of species represented in the target group, s, as shown in equation (4).

$$Q_S = \sum_s \sum_c Q_L \quad (4)$$

In the above example fishing trip, because only one species is targeted (largemouth bass), the $Q_S$ for the fish harvested and released can be computed as the sum of the two $HQ_L$ values and two $RQ_L$ values, respectively. In other words, the quality per target species harvested ($HQ_S$) would equal 13.94 and the quality per target species released ($RQ_S$) would equal 4.84.

To determine the Catch Points, the fishing trip quality indexes, which consist of the quality per target species for fish harvested ($HQ_S$) and quality per target species for fish released ($RQ_S$), are related to a length of time spent fishing, T, during a given fishing trip. In one embodiment, the relationship between the Catch Points, CP, for a given fishing trip and $HQ_S$, $RQ_S$, and T can be represented as follows:

$$CP \propto \sqrt{\frac{HQ_S + RQ_S}{T}} \quad (5)$$

where T is the length of the fishing trip in hours.

At this point it should be noted out that the type of fish anglers target varies depending upon whether the angler is fishing for sport or food. Sport fish anglers, for the most part, are targeting larger, predatory fish species, such as largemouth bass, smallmouth bass, trout, or striped bass. Food fish anglers, on the other hand, generally target fish such as crappie, sunfish, or catfish. Some of these food fish may get large (like certain catfishes), but the primary purpose for the harvest of such fish is for food.

As the type of fish targeted differs across the two general target species of sport fish and target fish, the exact computation of CP can differ for anglers targeting sport fish versus food fish. In this regard, the CP computations can differ across these two general target species groupings because of a difference in importance assigned to the catch components of harvested fish verses released fish. According to one advantageous embodiment, for anglers targeting sport fish, released fish are weighted by a sport fish predetermined weighting, preferably 1.50 more important than harvested fish. For food fish anglers, released fish are weighted a food fish predetermined weighting, preferably 1.05 more important as harvested fish. The predetermined weightings, which value released fish more than harvested fish in the above preferred embodiment, are designed to encourage catch-and-release fishing by all anglers. The predetermined weightings can be established in any one of a number of manners but, according to the preferred embodiment, fish released by food fish anglers are valued only slightly more (e.g., 5%) than harvested fish because the primary goal of the food fish angler is to take fish home, not to release the fish back into the water.

Accounting for the predetermined weightings, the processing element 16 can determine the Catch Points for sport fish anglers and food fish anglers by multiplying the released quality per target species by its respective predetermined weighting, and thereafter taking the square root of the sum of the quality per target species of the fish harvested and the weighted quality per target species of the fish released divided by the trip length. (Block 66). Additionally, the quality per target species of the fish harvested and the weighted target quality per species of the fish released can be scaled by a predetermined factor, such as 100. In this regard, for sport fish anglers and food fish anglers, the respective Catch Points can be determined according to the following equations (6) and (7):

$$CP_{SF} = \sqrt{\frac{100 \times HQ_S + 100 \times RQ_S \times PW_{SF}}{T}} \quad (6)$$

$$CP_{FF} = \sqrt{\frac{100 \times HQ_S + 100 \times RQ_S \times PW_{FF}}{T}} \quad (7)$$

As shown in equation (6), for sport fish anglers, $CP_{SF}$ represents the Catch Points and $PW_{SF}$ represents the sport fish predetermined weighting. Similarly, as shown in equation (7), for food fish anglers, $CP_{FF}$ represents the Catch Points and $PW_{FF}$ represents the food fish predetermined weighting. In the above example, assuming largemouth bass to be a sport fish and assuming a trip length of 5.5 hours, the $CP_{SF}$ for the example fishing trip can be determined to be 19.63.

To encourage more inexperienced anglers, the CP values can be bounded by an upper limit an a lower limit, according to this advantageous embodiment. Encouraging more inexperienced anglers is important because typically very inexperienced anglers make up large proportions of all anglers visiting reservoirs, and the number of very skilled anglers is relatively low. Additionally, by including an upper limit, possible erroneous catch entries that would increase an angler's rating inordinately are reduced. Thus, for example, if any CP value were determined to be less than a lower limit of 1, then the respective CP value is set equal to 1 (that is, 1 is the lowest CP value that can be assigned to a given trip). Similarly, for example, if any CP value is determined greater than 40, then the respective CP value is set equal to 40 (that is, 40 is the maximum CP value that can be assigned to a given trip. A CP value of 40 is very high, with typically only 2–3% of the angling trips exceeding 40, so the best anglers will not be harshly limited. Whereas the CP value is preferably scaled, it should be understood that the CP value need not be scaled.

As shown in equations (6) and (7), calculating the CP values utilizing the length of the fishing trip, T, the CP values are standardized across anglers who fished for different amounts of time. Then, by taking the square root of the entire ratio, the distributions of CP values are more normalized which, otherwise, would tend to be highly skewed toward smaller values with long tails toward larger values. Also, by taking the square root, the better anglers are handicapped, given that the square roots of larger numbers are proportionally smaller than square roots of smaller numbers. Thus, for example, assume two anglers have ratios of quality per target species to fishing trip time of 16 and 9 prior to taking the square root of the ratio. After taking the square root, the CP values of the anglers will be 4 and 3, respectively. As shown, the higher ratio was 78% greater than the lower ratio before the transformation. But after transformation, the difference in CP values is only 33%. The downward shift in Catch Points serves to pull the top anglers, represented in the long tails of the distributions, down to CP levels where most of the anglers are represented. The shift levels the "playing field" and, thus, is similar to a handicap in other types of sports, such as golf. Also, it is worth noting that bounding the CP distributions by the lower and upper limits also serves to handicap the better anglers and further equalize skill differentials.

Given that different lakes differ in their ability to produce various species of fish of various sizes, as well as differ with respect to length limit regulations (which serve to limit anglers' ability to harvest certain lengths of fish), the CP values are preferably standardized across the different lakes. To standardize the CP values according to one advantageous embodiment, a standard value (a value to which a trip CP can be compared) is subtracted from the determined CP value. In this regard, a standard value must be established for each lake.

Because the standard value is directly related to the CP values and differs from lake to lake, the established standard value is preferably based in some manner on the distributions of CP values that might be typical of the lakes under consideration. Therefore, the standard values can be established by setting each standard value equal to a predetermined percentile of a distribution of a plurality of CP values for the respective lakes. For example, the standard values, or Lake Standards, LS, can be set equal to the twenty-fifth percentile values of the CP distributions for the respective lakes. In this embodiment, choosing the twenty-fifth percentile favors the poorer anglers, in that by definition, only 25% of the anglers will have values below the established LS. It should be noted that fishing trips where anglers caught no fish (no harvest or release) are preferably not used to generate distributions of CP. Thus, CP and resulting LS values are preferably based on successful fishing trips only.

The LS values can be derived from any of a number of CP values, with larger numbers of CP values preferred. In this regard, typically thirty or more CP values will be used to determine initial LS values. It should be noted, however, that fewer than thirty values can be used, especially considering that fewer CP values will exist for uncommon fish in a given lake. Once the LS values for the lakes have been established, the LS values can dynamically change as more fishing information is stored in the electronic database. In this regard, the LS values for each lake can be reestablished periodically based upon more recent CP values for the respective lakes. Similarly, because the success rate of catching many fish can change based upon the season of the year, the LS values can be reestablished based upon seasonal CP values for the respective lakes.

As previously stated, the CP values of one embodiment are standardized by subtracting the LS from the determined CP value. (Block 68). As such, a standardized score, S, for any given fishing trip can be equal the differential between the CP for the respective trip and the LS for the lake fished, as shown in equation (8).

$$S = CP - LS \tag{8}$$

As shown by equation (8), if CP is greater than LS for a given trip, then S is positive. But if CP is less than LS, then S is negative. In the aforementioned example, assume that historical CP distribution for Lake Marion in S.C. USA, establishes a LS of 4.4, which is then rounded down to 4.0. Then, the S value for the example angler could be formed by subtracting previously calculated $CP_{SF}$ of 19.63 from the LS of 4, to form an S value of 15.63.

Based on the standard value LS as the predetermined percentile value (e.g., twenty-fifth percentile) of CP for a given target species and lake, negative scores will comprise a percentage of all trips taken equal to the predetermined percentile value (e.g., 25%). Similarly, positive scores will represent the remaining percent from one hundred percent of trips taken (e.g., 75%). It should be noted, however, that the aforementioned percentages are approximate given that some scores will equal zero exactly, such as when CP=SP. In this regard, scores equal to zero can be thought of as par for the lake, to use golf parlance. Because both CP and LS values are derived from the computational procedures described above, which tend to handicap the better anglers, scores can be viewed as intrinsically handicapped.

Once the score has been calculated, the processing element can form the angler rating, such as by setting the angler rating equal to the score. (Block 70). But as individual anglers continue to fish and enter fishing information for each trip, a series of trip scores can be calculated for each angler. In this regard, to get a more stable angler rating for each angler, the processing element can form an angler rating, or angler handicapped rating, HR, by utilizing multiple scores within the angler's series of trip scores.

According to one advantageous embodiment, the processing element 16 can form the angler's HR from a series of trip scores by determining the number of scores in the series and taking the average of a proportional number of highest scores in the series. But because a minimum number of scores in a series are preferred to adequately average a proportional number of those scores, if the number of scores in the series is less than a predefined number, the angler rating is set at the best score in the series. For example, if an angler has between one and four scores in the angler's series of trip scores, the HR of the individual angler can set as the best score in the series. In contrast, for example, if an angler has between five and six trip scores in the series, the HR can be set as the average of the two best scores in the series. And similarly, if a block is defined by between seven and eight scores, the HR can be set as the average of the three best scores in the series.

The number of scores and proportional averaging can thus continue in a similar fashion, with the number of highest scores averaged increasing. But to help keep the HR up to date and capable of changing, a maximum number of scores are preferably averaged when the number of scores in a series reaches a particular upper limit. Thus, for example, if an angler has over twenty scores in the series, the number of scores averaged can be capped at ten scores. And to keep the angler rating as current as possible, the ten scores averaged are taken from a predefined number of most recent scores, such as by averaging the highest ten scores from the twenty most recent scores in the series.

The present invention therefore enhances the fishing experience of anglers by forming angler ratings. By formulating standardized angular ratings, the present invention provides an objective comparison among anglers that can be used to handicap more experienced anglers and even the field of competition among various anglers when drawing comparisons among the anglers. Whereas the aforementioned description provides one technique by which to determine the angler ratings, it should be understood that the described technique is merely illustrative of one technique of determining the angler ratings. In this regard, determining the angler ratings based upon at least a portion of the fishing information can be accomplished according to any of a number of techniques without departing from the spirit and scope of the present invention.

In various advantageous embodiments, portions of the system and method of the present invention include a computer program product. The computer program product includes a computer-readable storage medium, such as the non-volatile storage medium, and computer-readable program code portions, such as a series of computer instructions, embodied in the computer-readable storage medium. Typically, the computer program is stored and executed by a processing unit or a related memory device, such as the processing element 16 as depicted in FIG. 1.

In this regard, FIGS. 1–5 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for determining at least one angler rating for at least one angler comprising:

a processing element capable of receiving fishing information, wherein the fishing information is associated with at least one lake, and wherein said processing element is capable of determining the at least one angler rating for at least one angler based on at least a portion of the fishing information; and an output element capable of outputting the at least one angler rating.

2. A system according to claim 1 further comprising at least one electronic database responsive to said processing element for storing the electronic fishing information based upon the fishing information received by said processing element, wherein said at least one electronic database is further capable of storing the at least one angler rating.

3. A system according to claim 2, wherein said processing element communicates with said at least one electronic database across a wide area network (WAN).

4. A system according to claim 3, wherein the WAN comprises the Internet.

5. A system according to claim 1, wherein said output element comprises a graphical user interface (GUI) responsive to said processing element for displaying the at least one angler rating.

6. A system according to claim 1, wherein said processing element is capable of determining the at least one angler rating by determining at least one trip point value for at least one fishing trip of the at least one angler on at least one lake, calculating at least one score based upon the at least one trip point value and at least one standard value for at least one lake associated with the at least one fishing trip, and thereafter determining the at least one angler rating based upon the at least one score and a number of fishing trips.

7. A system according to claim 6, wherein said processing element is further capable of establishing the at least one standard value for the at least one lake associated with the at least one fishing trip.

8. A system according to claim 7, wherein said processing element is capable of establishing the at least one standard value by setting the at least one standard value equal to a predetermined percentile of a distribution of a plurality of trip point values for the respective lakes.

9. A system according to claim 6, wherein said processing element is capable of determining the at least one trip point value by calculating at least one fish size index for at least one fish based upon a weight and a length point value for the at least one fish, determining at least one quality per length class based upon the at least one fish size index and a number of the at least one fish in a given length class, computing at least one quality per target species based upon the at least one quality per length class and a number of length classes of fish targeted, and thereafter determining the at least one trip point value based upon the at least one quality per target species and a trip length, and wherein when a group of species are targeted the computing is further based upon a number of fish of a species targeted in the group.

10. A system according to claim 6, wherein said processing element is capable of calculating the at least one score by subtracting the standard value for a respective lake from the trip point value for a fishing trip at the respective lake.

11. A method of determining at least one angler rating for at least one angler comprising the steps of:
    receiving fishing information, wherein the fishing information is associated with at least one lake;
    determining the at least one angler rating based on at least a portion of the fishing information; and
    outputting the at least one angler rating.

12. A method according to claim 11, wherein determining the at least one angler rating based on at least a portion of the fishing information comprises:
    determining at least one trip point value for at least one fishing trip on at least one lake;
    calculating at least one score based upon the at least one trip point value and at least one standard value for the at least one lake associated with the at least one fishing trip; and
    determining the at least one angler rating based upon the at least one score and a number of fishing trips.

13. A method according to claim 12 further comprising establishing at least one standard value for at least one lake associated with the at least one fishing trip, wherein establishing occurs before calculating the at least one score.

14. A method according to claim 12, wherein establishing at least one standard value comprises setting the at least one standard value equal to a predetermined percentile of a distribution of a plurality of trip point values for the respective lakes.

15. A method according to claim 12, wherein determining at least one trip point value comprises the steps of:
    calculating at least one fish size index for at least one fish based upon a weight and a length point value for the at least one fish;
    determining at least one quality per length class based upon the at least one fish size index and a number of the at least one fish in a given length class;
    computing at least one quality per target species based upon the at least one quality per length class and a number of length classes of fish targeted, wherein when a group of species are targeted the computing is further based upon a number of fish of a species targeted in the group; and
    determining the at least one trip point value based upon the at least one quality per target species and a trip length.

16. A method according to claim 15, wherein calculating the at least one fish size index comprises calculating the at least one fish size index by multiplying at least one weight of the at least one fish by a length point value, wherein the length point value is based upon at least one length of the at least one fish and a world record length of at least one species of the at least one fish.

17. A method according to claim 16, wherein calculating the at least one fish size index comprises calculating each of the at least one fish index according to the following:

$$SI = W \times LPV$$

wherein SI is the fish size index, W is the weight of the fish, and LPV is the length point value for the fish.

18. A method according to claim 15, wherein determining at least one quality per length class comprises determining at least one quality per length class by multiplying a number of the at least one fish in a given length class by the at least one fish size index.

19. A method according to claim 18, wherein determining at least one quality per length class comprises determining each quality per length class according to the following:

$$Q_L = N \times SI$$

wherein $Q_L$ is the quality per length class, N is number of fish in a given length class, and SI is the fish size index.

20. A method according to claim 15, wherein computing at least one quality per target species comprises computing at least one quality per target species by aggregating each quality per length class over a number of length classes of fish targeted, and wherein when a group of species are targeted the computing is calculated by further aggregating the aggregate quality per length classes over a number of species targeted in the group.

21. A method according to claim 20, wherein computing at least one quality per target species comprises computing each quality per target species according to the following:

$$Q_S = \sum_s \sum_c Q_L$$

wherein $Q_S$ is the quality per target species, s is a number of species targeted in the group, c is the number of length classes of fish targeted, and $Q_L$ is the quality per length class.

22. A method according to claim 15, wherein computing at least one quality per target species comprises computing the at least one quality per target species for each fish harvested and each fish released for each fishing trip.

23. A method according to claim 22, wherein determining the at least one trip point value comprises determining each trip point value by taking the square root of the sum of the quality per target species for the fish harvested and the fish released divided by the trip length.

24. A method according to claim 23, wherein determining the at least one trip point value comprises determining each trip point value according to the following:

$$CP = \sqrt{\frac{HQ_S + RQ_S}{T}}$$

wherein CP is the trip point value, $HQ_S$ is the quality per target species for the fish harvested, $RQ_S$ is the quality per target species for the fish released, and T is the trip length.

25. A method according to claim 23, wherein determining the at least one trip point value comprises determining the at least one trip point value based upon at least one predetermined weighting of the at least one quality per target species fish released.

26. A method according to claim 25, wherein the at least one predetermined weighting comprises a sport fish predetermined weighting and a food fish predetermined weighting.

27. A method according to claim 25, wherein determining the at least one trip point value comprises determining each trip point value according to the following:

$$CP = \sqrt{\frac{HQ_S + RQ_S \times PW}{T}}$$

wherein CP is the trip point value, $HQ_S$ is the quality per target species for the fish harvested, $RQ_S$ is the quality per target species for the fish released, PW is the at least one predetermined weighting, and T is the trip length.

28. A method according to claim 12, wherein determining at least one trip point value comprises determining the at least one trip point value such that each trip point value is bounded by an upper limit and a lower limit.

29. A method according to claim 12, wherein calculating at least one score comprises calculating the at least one score by subtracting the standard value for a respective lake from the trip point value for a fishing trip at the respective lake.

30. A method according to claim 29, wherein calculating at least one score comprises calculating the at least one score according to the following:

$$S = CP - LS$$

wherein S is the score, CP is the trip point value, and LS is the standard value.

31. A computer program product for determining at least one angler rating for at least one angler, the computer program product comprising a computer-readable storage medium having computer-readable program code embodied in said medium, the computer-readable program code comprising:
  a first executable portion for receiving fishing information, wherein the fishing information is associated with at least one lake;
  a second executable portion for determining the at least one angler rating based on at least a portion of the fishing information; and
  a third executable portion for outputting the at least one angler rating.

32. A computer program according to claim 31, wherein said second executable portion determines the at least one angler rating by:
  determining at least one trip point value for at least one fishing trip on at least one lake,
  calculating at least one score based upon the at least one trip point value determined and at least one standard value for at least one lake associated with the at least one fishing trip, and
  determining the at least one angler rating based upon the at least one score and a number of fishing trips.

33. A computer program product according to claim 32 further comprising a fourth executable portion for establishing at least one standard value for at least one lake associated with the at least one fishing trip, wherein establishing occurs before said second executable portion determines the at least one angler rating.

34. A computer program product according to claim 32, wherein said fourth executable portion establishes at least one standard value by setting the at least one standard value equal to a predetermined percentile of a distribution of a plurality of trip point values for the respective lakes.

35. A computer program product according to claim 32, wherein said second executable portion determines at least one trip point value by:
  calculating at least one fish size index for at least one fish based upon a weight and a length point value for the at least one fish,
  determining at least one quality per length class based upon the at least one fish size index and a number of the at least one fish in a given length class,
  computing at least one quality per target species based upon the at least one quality per length class and a number of length classes of fish targeted, wherein when a group of species are targeted the computing is further based upon a number of fish of a species targeted in the group, and
  determining the at least one trip point value based upon the at least one quality per target species and a trip length.

36. A computer program product according to claim 35, wherein said second executable portion calculates the at least one fish size index by multiplying at least one weight of the at least one fish by a length point value, wherein the length point value is based upon at least one length of the at least one fish and a world record length of at least one species of the at least one fish.

37. A computer program product according to claim 36, wherein said second executable portion calculates each of the at least one fish index according to the following:

$$SI = W \times LPV$$

wherein SI is the fish size index, W is the weight of the fish, and LPV is the length point value for the fish.

38. A computer program product according to claim 35, wherein said second executable portion determines at least one quality per length class by multiplying a number of the at least one fish in a given length class by the at least one fish size index.

39. A computer program product according to claim 38, wherein said second executable portion determines at least one quality per length class according to the following:

$$Q_L = N \times SI$$

wherein $Q_L$ is the quality per length class, N is number of fish in a given length class, and SI is the fish size index.

40. A computer program product according to claim 35, wherein said second executable portion computes at least one quality per target species by aggregating each quality per length class over a number of length classes of fish targeted, and wherein when a group of species are targeted the computing is calculated by further aggregating the aggregate quality per length classes over a number of species targeted in the group.

41. A computer program product according to claim 40, wherein said second executable portion computes at least one quality per target species according to the following:

$$Q_S = \sum_s \sum_c Q_L$$

wherein $Q_S$ is the quality per target species, s is a number of species targeted in the group, c is the number of length classes of fish targeted, and $Q_L$ is the quality per length class.

42. A computer program product according to claim 35, wherein said second executable portion computes the at least one quality per target species for each fish harvested and each fish released for each fishing trip.

43. A computer program product according to claim 42, wherein said second executable portion determines each trip point value by taking the square root of the sum of the quality per target species for the fish harvested and the fish released divided by the trip length.

44. A computer program product according to claim 43, wherein said second executable portion determines each trip point value according to the following:

$$CP = \sqrt{\frac{HQ_S + RQ_S}{T}}$$

wherein CP is the trip point value, $HQ_S$ is the quality per target species for the fish harvested, $RQ_S$ is the quality per target species for the fish released, and T is the trip length.

45. A computer program product according to claim 43, wherein said second executable portion determines the at least one trip point value based upon at least one predetermined weighting of the at least one quality per target species fish released.

46. A computer program product according to claim 45, wherein the at least one predetermined weighting comprises a sport fish predetermined weighting and a food fish predetermined weighting.

47. A computer program product according to claim 45, wherein said second executable portion determines each trip point value according to the following:

$$CP = \sqrt{\frac{HQ_S + RQ_S \times PW}{T}}$$

wherein CP is the trip point value, $HQ_S$ is the quality per target species for the fish harvested, $RQ_S$ is the quality per target species for the fish released, PW is the at least one predetermined weighting, and T is the trip length.

48. A computer program product according to claim 32, wherein said second executable portion determines the at least one trip point value such that each trip point value is bounded by an upper limit and a lower limit.

49. A computer program product according to claim 32, wherein said second executable portion calculates each score by subtracting the standard value for a respective lake from the trip point value for a fishing trip at the respective lake.

50. A computer program product according to claim 49, wherein said second executable portion calculates each score according to the following:

$$S = CP - LS$$

wherein S is the score, CP is the trip point value, and LS is the standard value.

* * * * *